July 9, 1929.  DE LOSS K. MARTIN  1,719,896
REDUCTION OF FADING OF RADIOSIGNALS
Filed Feb. 24, 1927

INVENTOR.
D. K. Martin
BY
ATTORNEY

Patented July 9, 1929.

1,719,896

UNITED STATES PATENT OFFICE.

DE LOSS K. MARTIN, OF WEST ORANGE, NEW JERSEY, ASSIGNOR TO AMERICAN TELEPHONE AND TELEGRAPH COMPANY, A CORPORATION OF NEW YORK.

REDUCTION OF FADING OF RADIOSIGNALS.

Application filed February 24, 1927. Serial No. 170,624.

This invention relates to improvements in methods of and means for reducing the fading of radio signals.

The term fading, as applied to radio signals, is used with the commonly accepted meaning, referring to the relatively slow changes in the amplitude of the signal with time. The phenomena of fading is usually manifested at night, but is not limited to this general period of time, as signal fading has also been observed during the sunlit period of the day. The fading of the radio signal is caused by the interference of two or more signals which are varying in amplitude and phase; the received signal is, of course, the resultant of the interfering signals. Fading is also variable with respect to space; this include the physical position of the receiving antenna and the space absorption characteristic of the antenna. The receiving signal may be conceived as being the resultant of several interfering wave fronts which are traversing a medium which is changeable in its characteristics. One component wave may be assumed to be intimately associated with the conductivity of the earth's surface over which it is passing. The transmission of this wave component, termed the direct wave, would not be modified by the presence or absence of sunlight as there is no reason to believe that light affects the conductivity of the ground. However, the other component waves traversing the upper atmosphere are materially modified by the absence of sunlight. Hence, in theory, it would be desirable to select with suitable means, the component or direct wave, from the resultant which will give uniform amplitude.

In practice, however, it is very difficult to make this selection, as it is necessary to balance out the variable components by combining out of phase these variable signals from two or more receiving points, and due to the very nature of these variable components it probably would be impossible to get a perfect balance. Or the direct wave signals may be balanced out, leaving the combination of variable components whose resultant also would be expected to be variable to a degree. Hence, a compromise of these two methods would seem to afford a desirable method of obtaining a solution. Accordingly, it is the general purpose of the arrangements of this invention to combine the signals from two or more receiving points and to provide means to maintain the resultant of this combination substantially uniform in amplitude. Other features and purposes of this invention will appear more fully from the detailed description thereof hereinafter given.

Figure 1:
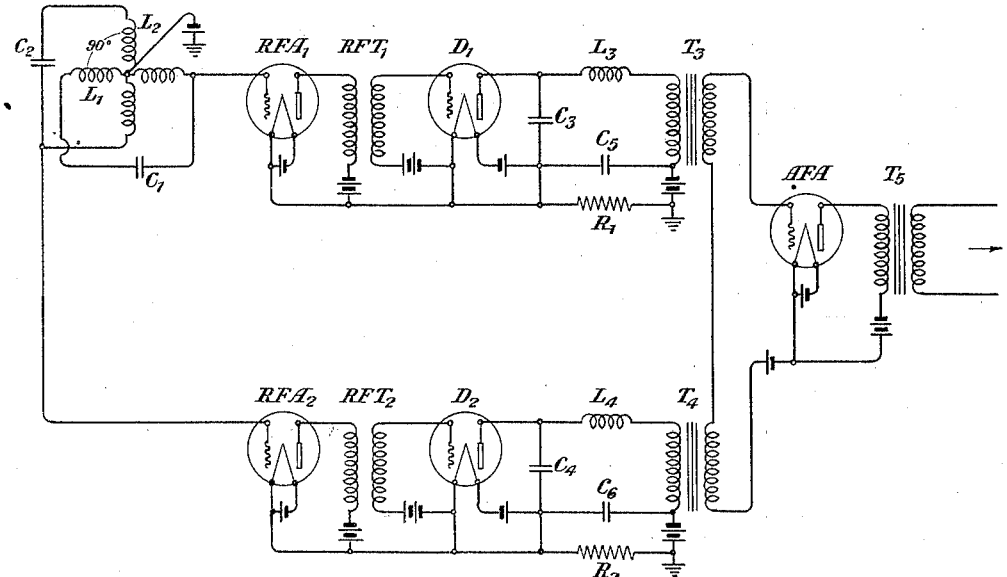
Figure 2:
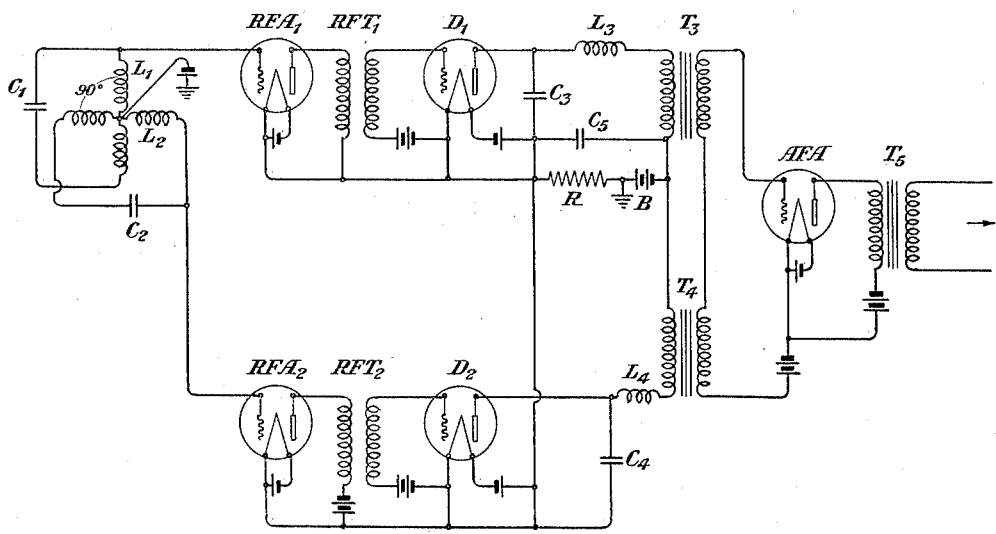

The invention may be more fully understood from the following description, together with the accompanying drawing, in the Figures 1 and 2 of which are shown circuit diagrams embodying one form of the invention and a modification thereof. Similar reference characters have been utilized to denote like parts in both of the figures of the drawing.

In Fig. 1 is shown a receiving circuit which takes advantage of the difference in the space absorption characteristics of two loop antennæ $L_1$ and $L_2$ placed with their axes perpendicular to each other. Each loop is tuned by the condensers $C_1$ and $C_2$ to receive signals of the same frequency. The received signals from each loop circuit are amplified and detected separately by the radio frequency amplifiers $RFA_1$, $RFA_2$ and the detectors $D_1$ and $D_2$. The audio signals from the detectors are combined by connecting in series the secondaries of the detectors and output transformers $T_3$ and $T_4$, whence they may be amplified by the audio frequency amplifier AFA and transmitted through a transformer $T_5$ to a receiving circuit.

The signals from each of the loops $L_1$ and $L_2$ will have different fading characteristics due to the directional properties of the loop antennæ and the variations in the wave front of the transmitted wave at the receiver. The signal from one loop may be increasing and the signal from the other decreasing, hence by combining the two some improvement in the stability of the signal may be expected. But experience with similar receiving circuits where the audio signals were combined has demonstrated that satisfactory uniformity in signal amplitude is not obtained. Accordingly, to improve the stability of the signal over that obtained by simple combination, means are provided in the receiving circuits shown to regulate automatically the gain of the radio frequency amplifiers in addition to combining the audio signals at the output of the detectors.

The gain in the radio frequency amplifiers $RFA_1$ and $RFA_2$ is controlled by changing the grid potentials. The grid potentials are varied by applying to the respective grid circuits the voltage drop along the resistances $R_1$ and $R_2$ caused by the varying plate circuit current of the detectors $D_1$ and $D_2$. In the detector circuits $C_3$ and $C_4$ are the usual radio frequency by-passing condensers, and $C_5$ and $C_6$ are audio frequency by-passing condensers for tuning the circuit for the purpose of preventing an audio frequency voltage drop in the resistances $R_1$ and $R_2$.

The operation of the arrangements is as follows: The variation in the plate current of the detectors $D_1$ and $D_2$ is primarily due to the fading of the carrier signal impressed on the grid of the detector tubes from the output circuit of the radio frequency amplifiers. As the carrier signal fades to a maximum, or in other words increases in amplitude, the plate current of the detector will increase, which in turn results in a greater voltage drop along the resistance, such as $R_1$, in the plate circuit; this voltage drop along the resistance is applied to the grid of the radio frequency amplifier so as to make the grid more negative with increasing plate current and less negative, from a mean value, for decreasing plate current. An increase in the negative grid potential applied to the amplifier tube will reduce the gain obtained from that tube. Obviously, the converse of this relation is also effected. Hence, with the amplitude of each signal automatically maintained by the above arrangements, within the limits of this control method, the constancy of the amplitude of the combined signals will be materially improved.

In Fig. 2 is shown a circuit arrangement similar to that shown in Fig. 1 except that the gain regulation of the radio frequency amplifiers is accomplished through the use of the voltage drop along a single resistance R due to the combined current from the detectors $D_1$ and $D_2$. This will result in an improvement in the stability of the resultant signal over that obtained from separate gain regulation of the signals before combination at the output of the detectors. In former arrangements shown in Fig. 1 the gain regulation must keep each signal at a substantially uniform level or the resultant from the combination will depart materially from a mean value, while in the arrangements shown in Fig. 2 the gain in both circuits is modified simultaneously to maintain the resultant signal at a mean level.

It is pointed out that the receiving systems above described are limited in their effectiveness by the fact that the signals from any receiver are changing in phase as well as amplitude, hence, the combination of two or more signals at the outputs of the detector circuits will not be the algebraic sum but the vector sum of the several signals.

It is pointed out that the receiving systems of the invention may be utilized in connection with antennæ separated in space. The loop antenna might be used at one point and a vertical antenna employed at another. Likewise, the use of two antennæ at a common point need not be limited to crossed loops. The loop and vertical antennæ may be used, or a vertical and horizontal combination, or the signal from three antennæ at one point may be combined, as would be obtained by the use of two crossed loops and a vertical antenna.

Accordingly, while the invention has been disclosed as embodied in certain specific arrangements, it is pointed out that it may equally well be embodied in many other and widely varied forms without departing from the spirit of the invention as defined by the appended claims.

What is claimed is:

1. A radio receiving system comprising two separate circuits each comprising an antenna, an amplifier, and a detector, a common receiver circuit, transformer means to combine the outputs of said detectors on said common receiver circuit, resistances in the plate circuits of said detectors, and means to utilize the voltage drop across said resistances to regulate the gain of said amplifiers.

2. The method of reducing fading of radio signals which comprises separately detecting said signals, combining said separately detected signals, and utilizing variations in a voltage drop in the outputs of said separate steps of detection to automatically regulate the gain therein.

In testimony whereof, I have signed my name to this specification this 23rd day of February 1927.

DE LOSS K. MARTIN.